(12) United States Patent
Lu et al.

(10) Patent No.: US 12,686,023 B2
(45) Date of Patent: Jul. 21, 2026

US012686023B2

(54) SPRAYER COMPRISING DETECTION SYSTEM FOR EARLY TURN OFF

(71) Applicant: PixArt Imaging Inc., Hsin-Chu City (TW)

(72) Inventors: Shih-Jen Lu, Hsin-Chu City (TW); Yang-Ming Chou, Hsin-Chu City (TW); Chih-Hao Wang, Hsin-Chu City (TW); Chien-Yi Kao, Hsin-Chu City (TW); Hsin-Yi Lin, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 273 days.

(21) Appl. No.: 18/530,152

(22) Filed: Dec. 5, 2023

(65) Prior Publication Data

US 2024/0100553 A1 Mar. 28, 2024

Related U.S. Application Data

(63) Continuation-in-part of application No. 17/840,596, filed on Jun. 14, 2022, now Pat. No. 12,251,722, which is a continuation-in-part of application No. 17/144,080, filed on Jan. 7, 2021, now Pat. No. 11,867,498.

(60) Provisional application No. 62/963,189, filed on Jan. 20, 2020.

(51) Int. Cl.
*B05B 12/08* (2006.01)

(52) U.S. Cl.
CPC .................................. *B05B 12/082* (2013.01)

(58) Field of Classification Search
CPC .. A61M 2205/3306; A61M 2205/3386; A61M 2205/276; B05B 17/0676; B05B 12/082; B05B 12/081; B05B 12/004
See application file for complete search history.

(56) References Cited

U.S. PATENT DOCUMENTS

| | | | | |
|---|---|---|---|---|
| 7,934,703 | B2 | 5/2011 | Tomono | |
| 10,314,781 | B2 * | 6/2019 | Verschueren | ....... B05B 17/0615 |

(Continued)

FOREIGN PATENT DOCUMENTS

| | | | |
|---|---|---|---|
| CN | 203578103 | U | 5/2014 |
| CN | 103889488 | A | 6/2014 |
| CN | 203750763 | U | 8/2014 |

(Continued)

*Primary Examiner* — Christopher R Dandridge
(74) *Attorney, Agent, or Firm* — Winston Hsu

(57) ABSTRACT

A sprayer, comprising: a container, configured to contain liquid; a passage, comprising a first opening, a second opening, a resonator and a mesh, when the liquid is passed through the resonator, the liquid is emitted as a gas; a first optical sensor, configured to sense first optical data of at least portion of the mesh or at least portion of a surface of the container; and a processing circuit, configured to compute a foaming level of the mesh or of the surface according to the first optical data, and configured to determine whether the resonator should be turned off or not according to the foaming level. In another aspect, the processing circuit estimates a liquid level of the liquid but does not correspondingly turn off the resonator. By this way, the resonator may be turned on or turned off more properly and the liquid level may be more precisely estimated.

20 Claims, 6 Drawing Sheets

(56) References Cited

U.S. PATENT DOCUMENTS

| | | | | |
|---|---|---|---|---|
| 10,520,300 | B2 * | 12/2019 | MacLean | G01B 11/22 |
| 2018/0052088 | A1 * | 2/2018 | Sarkar | G01N 15/0227 |

FOREIGN PATENT DOCUMENTS

| | | | |
|---|---|---|---|
| CN | 106999970 | A | 8/2017 |
| CN | 109414717 | A | 3/2019 |

* cited by examiner

SPRAYER COMPRISING DETECTION SYSTEM FOR EARLY TURN OFF

CROSS REFERENCE TO RELATED APPLICATIONS

This application is a continuation-in-part of U.S. application Ser. No. 17/840,596, filed on Jun. 14, 2022, which is a continuation-in-part of U.S. application Ser. No. 17/144,080, filed on Jan. 7, 2021, which claims the benefit of U.S. Provisional Application No. 62/963,189, filed on Jan. 20, 2020. The contents of these applications are incorporated herein by reference.

BACKGROUND OF THE INVENTION

1. Field of the Invention

The present invention relates to a sprayer, and particularly relates to a sprayer which can initiate turn off of the resonator according to a foaming level in the sprayer.

2. Description of the Prior Art

In a sprayer, a liquid container holds liquid to be vaporized. The sprayer further contains an ultrasonic resonator, which is disposed in a lower part of the liquid container. A standard implementation of the ultrasonic resonator is a mesh containing a plurality of tiny holes. The liquid passes through the tiny holes while the mesh resonates at a high frequency (such as ultrasonic), which causes the liquid to be emitted as a gas. When little or no liquid is being passed through the mesh, the ultrasonic resonator is at risk of damage. Conventional technologies therefore detect the absence of liquid in the liquid container, or detect when liquid levels are low, and turn off the resonator according to the detection.

A conventional method for determining a low or zero level of liquid in the container is to dispose at least two electrodes on the mesh. When liquid levels are sufficient to cover the mesh, the electrodes are conductive. When liquid levels are too low or empty such that no liquid or insufficient liquid covers the mesh, the electrode will not be conductive.

One issue that exists in the prior art is that, even when there is no liquid in the container, there may be bubbles left over from the resonated liquid which cover the mesh. This results in the electrodes being conductive although the liquid levels are not sufficient for the ultrasonic resonator to generate a gas output. The resonator will therefore not be powered off even though there is no liquid in the container, meaning the resonator will be damaged.

SUMMARY OF THE INVENTION

One objective of the present invention is to provide a sprayer which can properly turn off the resonator.

Another objective of is to provide a sprayer which can precisely estimate a liquid level.

One embodiment of the present invention provided a sprayer, comprising: a container, configured to contain liquid; a passage, comprising a first opening, a second opening, a resonator and a mesh, wherein when the liquid in the container is passed through the resonator via the first opening, the liquid is emitted as a gas via the second opening; a first optical sensor, configured to sense first optical data of at least portion of the mesh or at least portion of a surface of the container; and a processing circuit, configured to compute a foaming level of the mesh or of the surface according to the first optical data, and configured to determine whether the resonator should be turned off or not according to the foaming level.

Another embodiment of the present invention provided a sprayer, comprising: a container, configured to contain liquid; a passage, comprising, a first opening, a second opening, a mesh and a resonator, wherein when the liquid in the container is passed through the resonator via the first opening, the liquid is emitted as a gas via the second opening; a first optical sensor, configured to sense first optical data of at least portion of a mesh in the first opening or at least portion a surface of the container; and a processing circuit, configured to estimate a liquid level of the liquid according to the first optical data.

In view of above-mentioned embodiments, the resonator may be turned on/turned off more properly and the liquid level may be more precisely estimated.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. The term "first", "second", "third" in following descriptions are only for the purpose of distinguishing different one elements, and do not mean the sequence of the elements. For example, a first device and a second device only mean these devices can have the same structure but are different devices.

Figure 1:
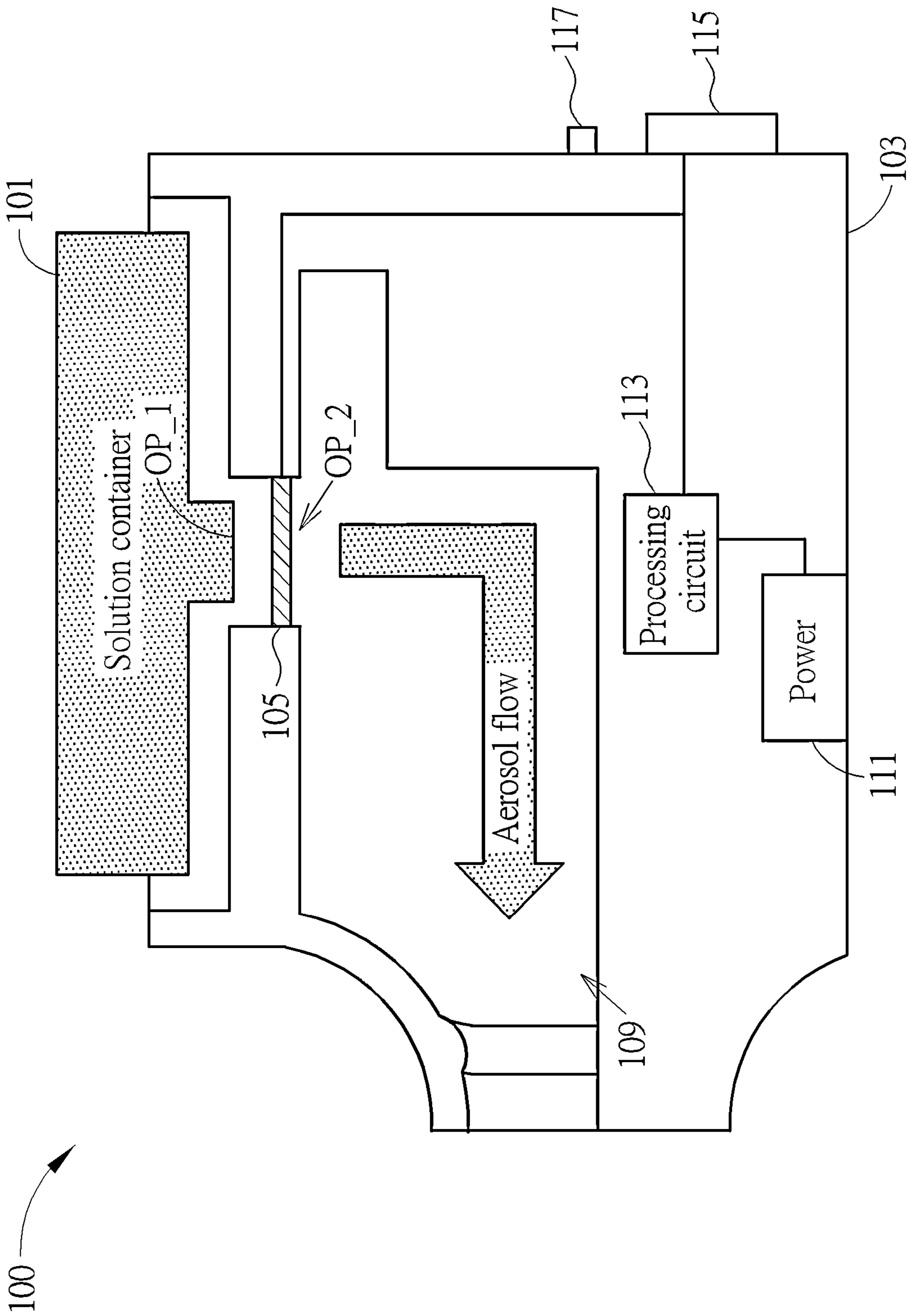
FIG. 1 is a schematic diagram illustrating a sprayer according to one embodiment of the present invention.

FIG. 1 is a schematic diagram illustrating a sprayer according to one embodiment of the present invention. The sprayer 100 comprises a container 101, a body 103, a mesh 105, a passage 109, a power source 111, a processing circuit 113, a switch 115 and an LED 117. The container 101 is configured to contain liquid. In one embodiment, the container 101 is removable from the body 103 and the container 101 has a first opening OP_1 to release the liquid. The body 103 comprises a passage 109 for the aerosol (gas) flow. The passage 109 has a second opening OP_2. In one embodiment, the second opening faces the first opening OP_1 of the container 101 for receiving the liquid from the container 101. In another embodiment, the first opening OP_1 overlaps the second opening OP_2.

A mesh 105 is disposed in the second opening OP_2 to vaporize the liquid from the container 101 into gas. Briefly, when the liquid in the container 101 is passed through the mesh 105 via the first opening OP_1, the liquid is emitted as a gas via the second opening OP_2. In other words, the mesh 105 serves as a resonator in such example. However, the mesh 105 and the resonator can be two independent devices. The power source 111 provides power (current) to the components in the sprayer 100, such as the processing circuit 113, the mesh 105 and the optical sensors which will be described in following descriptions.

A switch 115 may be disposed on the outer surface of the sprayer 100 to allow a user to power-on/off the sprayer 100. In this case, the switch 115 is also electrically coupled to the processing circuit 113 so that, when a user powers-on or powers-off the sprayer 100, the processing circuit 113 turns on the mesh 105 accordingly. As shown in FIG. 1, the processing circuit 113 is also electrically coupled to the mesh 105, allowing the processing circuit 113 to directly turn off the mesh 105 when a low or zero liquid level of the container 101 is detected.

In one embodiment, the sprayer 100 comprises at least one optical
sensor configured to sense first optical data of at least portion of the mesh 105, or configured to sense first optical data of at least portion of a surface of the container 101. The locations of the first optical sensor will be described in the descriptions of FIG. 2.

In such case, the processing circuit 113 is configured to compute a foaming level of the mesh 105 or of the surface according to the first optical data. The processing circuit 113 is also configured to determine whether the resonator should be turned off or not according to the foaming level. For example, if the processing circuit 113 determines that the liquid levels in the container 101 are getting low according to the foaming level, the processing circuit 113 turns off the resonator. On the opposite, if the processing circuit 113 determines that the liquid levels in the container 101 are still high according to the foaming level, the processing circuit 113 does not turn off the resonator.

In the above situation, the user may be informed that liquid levels in the container 101 are getting low by emitting a sound or activating a visual indicator such as an LED 117, which is illustrated as positioned above the switch 115, but is not limited therein. The LED 117 can be controlled by the processing circuit 113 upon receiving feedback from the processing circuit 113.

Figure 2:
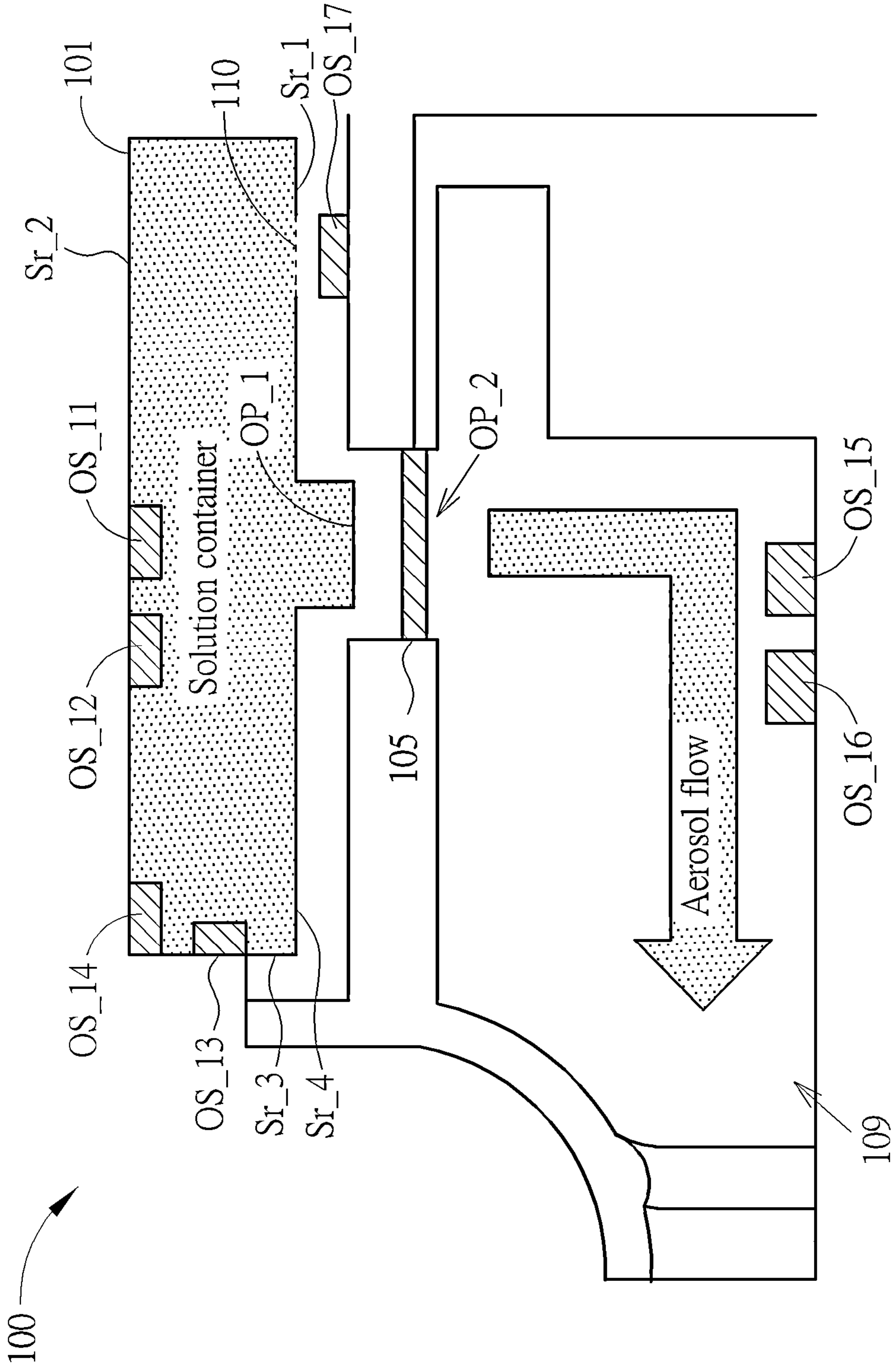
FIG. 2 is a schematic diagram of a partial enlarged diagram of FIG. 1.

The above-mentioned first optical sensor can be provided at any location, once the first optical sensor may sense the first optical data of at least portion of the mesh 105 or the surface of the container 101. In order to explain the locations of the first optical sensor, a portion of FIG. 1 is enlarged for explaining. FIG. 2 is a schematic diagram of a partial enlarged diagram of FIG. 1. Please note, some components of FIG. 1 are not illustrated in FIG. 2, for the convenience of explaining.

In the embodiment of FIG. 2, the container 101 comprises a first surface Sr_1, a second surface Sr_2 and a third surface Sr_3. The second surface Sr_2 is opposite to the first surface Sr_1. The third surface Sr_3 is connected between the first surface Sr_1, the second surface Sr_2 and is non-parallel with the first surface Sr_1 and the second surface Sr_2. In the embodiment of FIG. 2, the angle between the third surface Sr_3 and the second surface Sr_2, and the angle between the third surface Sr_3 and the first surface Sr_1 are 90°, but not limited. In other words, the container 101 may have another shape such as a trapezoid rather the rectangle illustrated in FIG. 1 and FIG. 2.

In one embodiment, the first opening OP_1 is in the first surface Sr_1 and the first optical sensor is disposed to the second surface Sr_2, such as the first optical sensor OS_11 or the first optical sensor OS_12 shown in FIG. 2. In another embodiment, the first optical sensor is disposed to the third surface Sr_3, such as the first optical sensor OS 13. In still another embodiment, the first optical sensor is disposed in a corner formed by the second surface Sr_2 and the third surface Sr_3, such as the first optical sensor OS_14. In still another embodiment, the first optical sensor is in the passage 109, such as the first optical sensor OS_15 or the first optical sensor OS_16.

Figure 3:
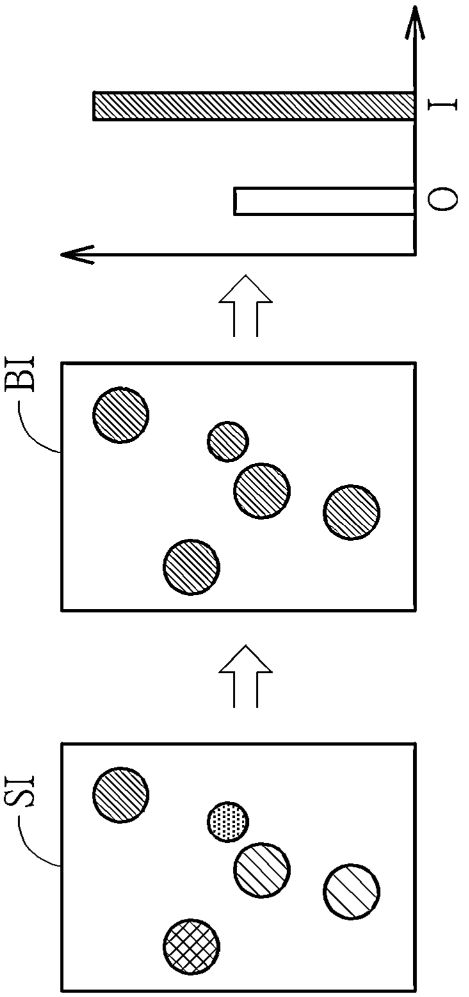
FIG. 3 is a schematic diagram illustrating steps for determining a foaming level according to one embodiment of the present invention.

In one embodiment, the above-mentioned first optical data is at least one sensing image, and the processing circuit 113 computes the foaming level according to bright information of the sensing image. FIG. 3 is a schematic diagram illustrating steps for determining a foaming level according to one embodiment of the present invention. In the embodiment of FIG. 3, the sensing image which is sensed by the first optical sensor is transformed to a binary image BI, which has only two pixel values 0 and 1. The numbers of pixels with pixel values of 0 and 1 are respectively computed, for example, by histograms shown in FIG. 3. In one embodiment, the pixels with the pixel value 1 mean bubbles images and the pixels with the pixel value 0 mean non-bubble images. Accordingly, the foaming level can be acquired via respectively computing the numbers of pixels with pixel values of 0 and 1.

In one embodiment, a table records the relations between numbers of pixels and the foaming level is provided. For example, if the number of the pixels with a pixel value 1 is between 0-100, it means the foaming level is low. For another example, if the number of the pixels with a pixel value 1 is above 1000, it means the foaming level is high.

In one embodiments, the sensing image illustrated in FIG. 3 is sensed by the first optical sensor which faces the second opening OP_2, such as the first optical sensor OS_11 or OS_15. In another embodiment, the liquid level may be determined according to a brightness uniformity of the sensing image. In such case, the above-mentioned first optical sensor may output an image quality index which represents the brightness uniformity.

If the liquid level is low, the surface may expose out from the liquid, thus the brightness uniformity of the sensing image may drops due to the image of the surface. For example, if the liquid level in the container 101 is too low such that the forth surface Sr_4 exposes from the liquid, the sensing image of the first optical sensor OS_12 may have a low brightness uniformity due to the image of the forth surface Sr_4. Further, in one embodiment, the sprayer 100 further comprises a light transparent window 110 and a first optical sensor OS_17. The light transparent window 110 is opposite to the second surface Sr_2 and the first optical sensor OS_17 faces the liquid above the first surface Sr_1 through the light transparent window 110. In such case, if the liquid level in the container 101 is low, the sensing image of the first optical sensor OS_17 may have a low brightness uniformity. In such case, the low brightness uniformity may be caused by the image of the second surface Sr_2 or the image of the liquid.

Figure 4:
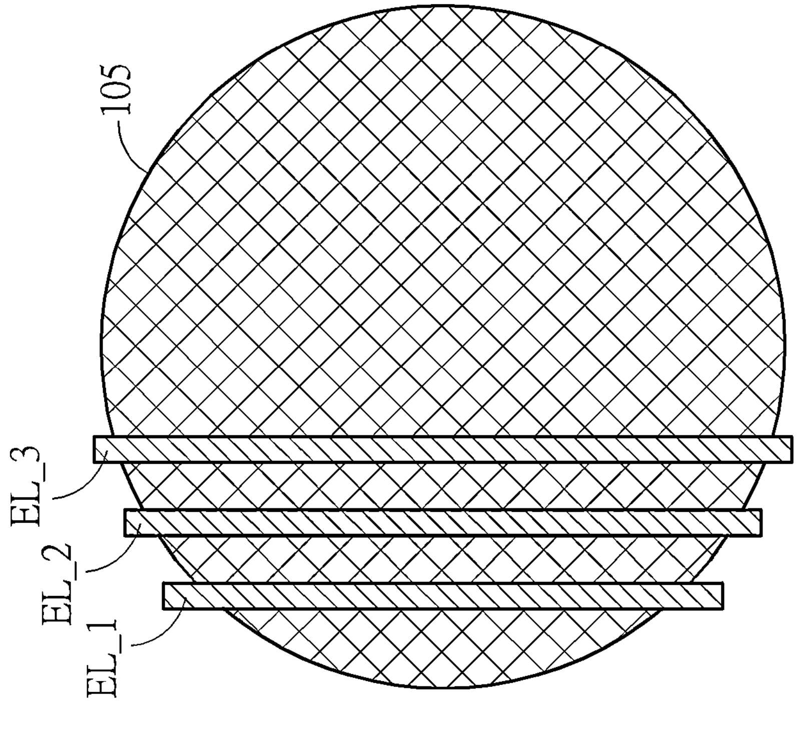
FIG. 4 is a schematic diagram illustrating at least one electrode provided to the mesh, according to one embodiment of the present invention.

In one embodiment, at least one electrode (three electrodes EL_1, EL_2, EL_3 are illustrated for an example) is disposed to the mesh 105, as shown in FIG. 4. Please note the number, the sizes and the arrangement of the electrodes are not limited to which of the electrodes EL_1, EL_2, EL_3 illustrated in FIG. 4. If the number of the electrode is two or more than two, when liquid levels are sufficient to cover the mesh 105, the electrodes are short (conductive). On the contrary, when liquid levels are too low or empty such that no liquid or insufficient liquid covers the mesh 105, the electrodes will not be conductive to each other. If the number of the electrode is one, when liquid levels are sufficient to cover the mesh 105, the electrode is conductive with another reference component, such as a metal line. On the contrary, when liquid levels are too low or empty such that no liquid or insufficient liquid covers the mesh 105, the electrode is not conductive with another component.

Accordingly, in the embodiment of FIG. 4, the processing circuit 113 further determines whether the electrode is conductive or not. If the electrode is conductive, it may mean the liquid level of the liquid in the container 101 is high. Also, if the foaming level is lower than a first level threshold, it may mean the liquid level of the liquid in the container 101 is high. On the contrary, if the foaming level is higher than the first level threshold, it may mean the liquid level of the liquid in the container 101 is low. Accordingly, if the processing circuit 113 determines that the electrode is conductive and the foaming level is lower than the first level threshold, the processing circuit does not turn off the resonator, since both the results mean the liquid level is still high.

In another embodiment, if the processing circuit 113 determines that the electrode is conductive but the foaming level is higher than a second level threshold, the processing circuit 101 turns off the resonator. The first level threshold and the second level threshold can be identical, but can be different as well. In another embodiment, the processing circuit 101 still keeps the resonator to operate, until the processing circuit 113 determines that the electrode is non-conductive. In still another embodiment, the processing circuit 101 turns off the resonator according to only one of a result of the electrode is conductive or not and a result of the foaming level, rather than referring two results. Such variations of the embodiments illustrated in FIG. 1, FIG. 2, FIG. 3 and FIG. 4 should also fall in the scope of the present invention.

Figure 5:
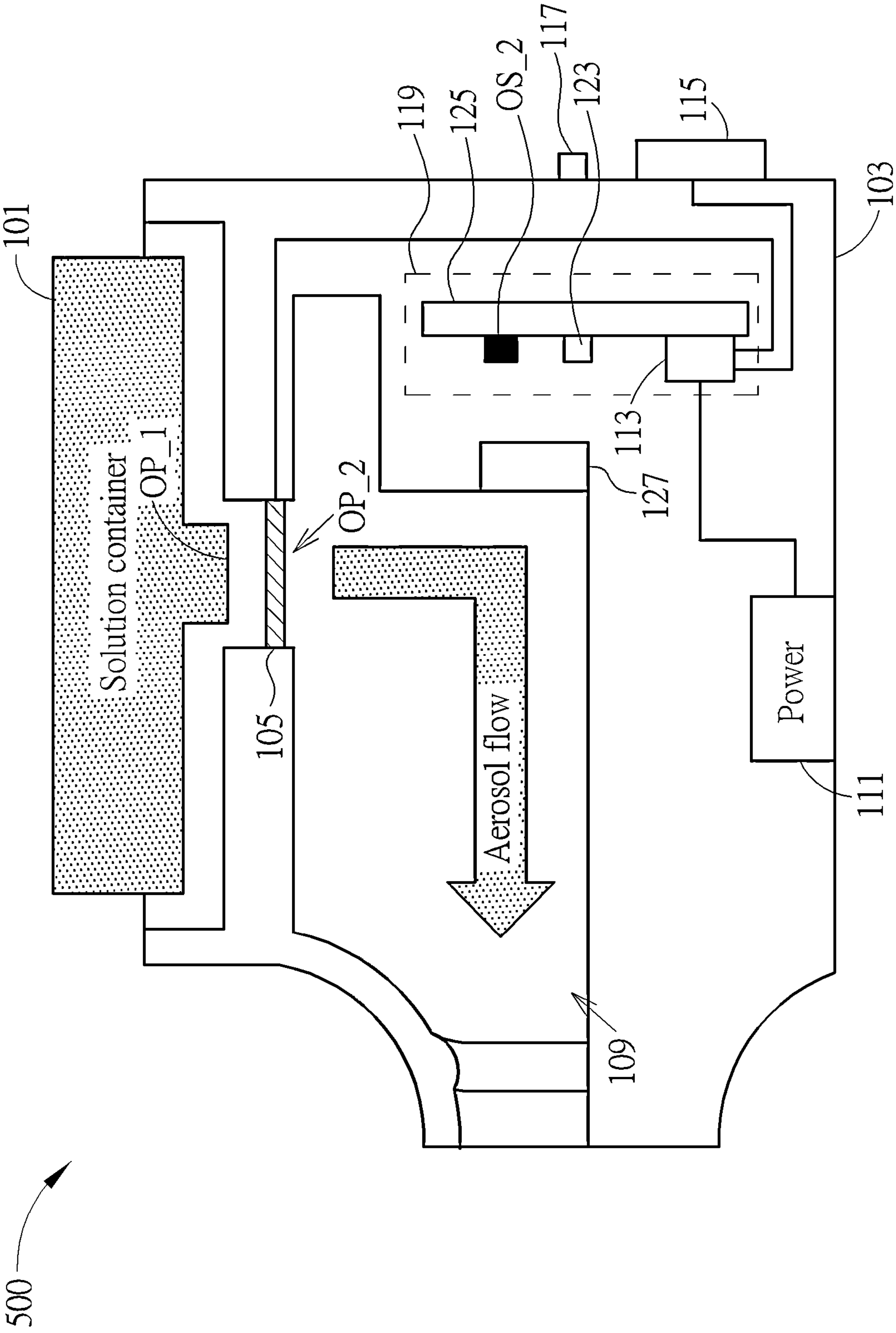
FIG. 5 is a schematic diagram illustrating a sprayer according to another embodiment of the present invention.

The processing circuit 113 can turn off the resonator according to other information the above-mentioned first optical data. FIG. 5 is a schematic diagram illustrating a sprayer according to another embodiment of the present invention. In the embodiment of FIG. 5, the sprayer 500 further comprises a detection device 119. The detection device 119 comprises the processing circuit 113, a second optical sensor OS_2 and a light source 123 assembled in a substrate 125.

The light source 123 illuminates the gas and the illuminated gas is reflected by the passage 109 and detected by the second optical sensor OS_2. The processing circuit 113 receives brightness information (such as an intensity value) from the second optical sensor OS_2, wherein the processing circuit 113 may be a DSP, an MCU or any hardware capable of calculating digital or analog signals. The second optical sensor OS_2 may be a CMOS image sensor or a photodiode capable of detecting light emitted by the light source 123. The light source 123 may be an LED or a Laser capable of emitting light to the passage 109.

The above-mentioned power source 111 further provides power (current) to the substrate 125, and therefore operates to power the processing circuit 113, the second optical sensor OS_2, and the light source 123. The processing circuit 113 is electrically coupled to the second optical sensor OS_2, the light source 123 and the resonator to control operations of the second optical sensor OS_2, the light source 123 and the resonator. In one embodiment, the light source 123 may be controlled by another controller independent from the processing circuit 113.

As illustrated in FIG. 5, the passage 109 comprises a light transparent window 127 facing the second optical sensor OS_2 and the light source 123 to allow light emitted by the light source 123 to pass through and illuminate the emitted gas, as well as allowing the second optical sensor OS_2 to detect the illuminated gas.

By illuminating the emitted gas with the light source 123 and detecting light information by the second optical sensor OS_2, the average intensity of the received light from the second optical sensor OS_2 can be calculated by the processing circuit 113, enabling the processing circuit 113 to determine the average density of the gas. Although the invention is not restricted to detecting a particular gaseous suspension, the particles suspended in the emitted gas should be large enough to influence the density of the gas when illuminated by the light source.

When the gas is illuminated with the light source 123, the light will be reflected by the gas, with an amount/intensity of reflected light according to the density of the gas. If the gas is very dense then the reflected light will be of a high intensity; as the density of the gas decreases, so will the intensity of the reflected light. At least one threshold corresponding to a specific intensity of reflected light (preferably a low intensity) is set. When the reflected light falls below this threshold, it can be determined that the liquid level within the diffuser has become low enough such that an insufficient number of particles are emitted causing the gas to become less dense. At this point, the processing circuit 113 can determine to turn off the resonator.

As different liquids will have different densities when emitted as a gas, it is possible to set multiple thresholds corresponding to different liquids. In this case, the processing circuit 113 can be set to detect a particular threshold corresponding to a particular liquid by being set in a particular mode. Furthermore, it is also possible to set multiple thresholds corresponding to different densities of a same gas. As detailed in the background, when there is a low level liquid in the container 101, the resonator can still emit a gas and therefore will not be immediately damaged; when the liquid level in the container 101 is almost zero, the resonator is in immediate danger of being damaged. By setting a first threshold corresponding to the first situation, and setting a second threshold corresponding to the second situation, an intensity of the emitted gas falling below the first threshold can be used to inform a user that liquid in the container 101 should be replaced, but will not result in immediate turn off of the resonator. In the embodiment of FIG. 5, the internal surface of the passage 109 should not be highly reflective as this will cause the reflected light intensity to give an erroneous result with regards to the light intensity.

In both an operation mode where only one threshold is set and an operation mode where multiple thresholds are set, the processing circuit 113 will directly stop the resonator from generating the gas when a parameter of the received light is below a threshold corresponding to a low liquid level meaning the resonator is in imminent danger of being damaged. For example, the processing circuit 113 determines if the intensity level of the reflected light received by the second optical sensor OS_2 is lower than a threshold, and identifies the liquid level as being insufficient when the intensity level is lower than the threshold. The threshold may be able to be manually adjusted by a user, or automatically adjusted when the processor receives the information of the liquid through a wired connection port (ex, USB) or wireless connection (ex, Bluetooth).

In one embodiment, the light source 123 is infrared (IR) light, as this will be invisible to a user and will therefore not influence or affect the user in any negative way. In another embodiment, it is also possible for the light source 123 to comprise a plurality of light sources which emit light of multiple wavelengths, and the second optical sensor OS_2 may detect different light intensity information corresponding to these different wavelengths, which enables the processing circuit 113 to analyze the dense of the gas more precisely. In one embodiment, ultrasound waves may be used instead of infrared waves.

A standard size of the particle which can be detected is 5 micrometers. In one embodiment, the detection device 119 is only able to detect a specific particle size. In another embodiment, the detection device 119 may be able to detect particles over a range of sizes. In this case, the second optical sensor OS_2 may be instructed as to which size particle is to be detected, and a detection range of the second optical sensor OS_2 is set accordingly.

Once the resonator is turned off by the processing circuit 113 so that no gas is emitted, the second optical sensor OS_2 and the light source 123 may then be reset or turned off correspondingly.

The above structure may also be applied to a system for detecting the cleanliness/purity of air. As is well-known, micro-particles such as 2.5 and 5 are present in air which indicates pollution. The above embodiment can thereby be applied to a system for testing the pollution index of air.

Figure 6:
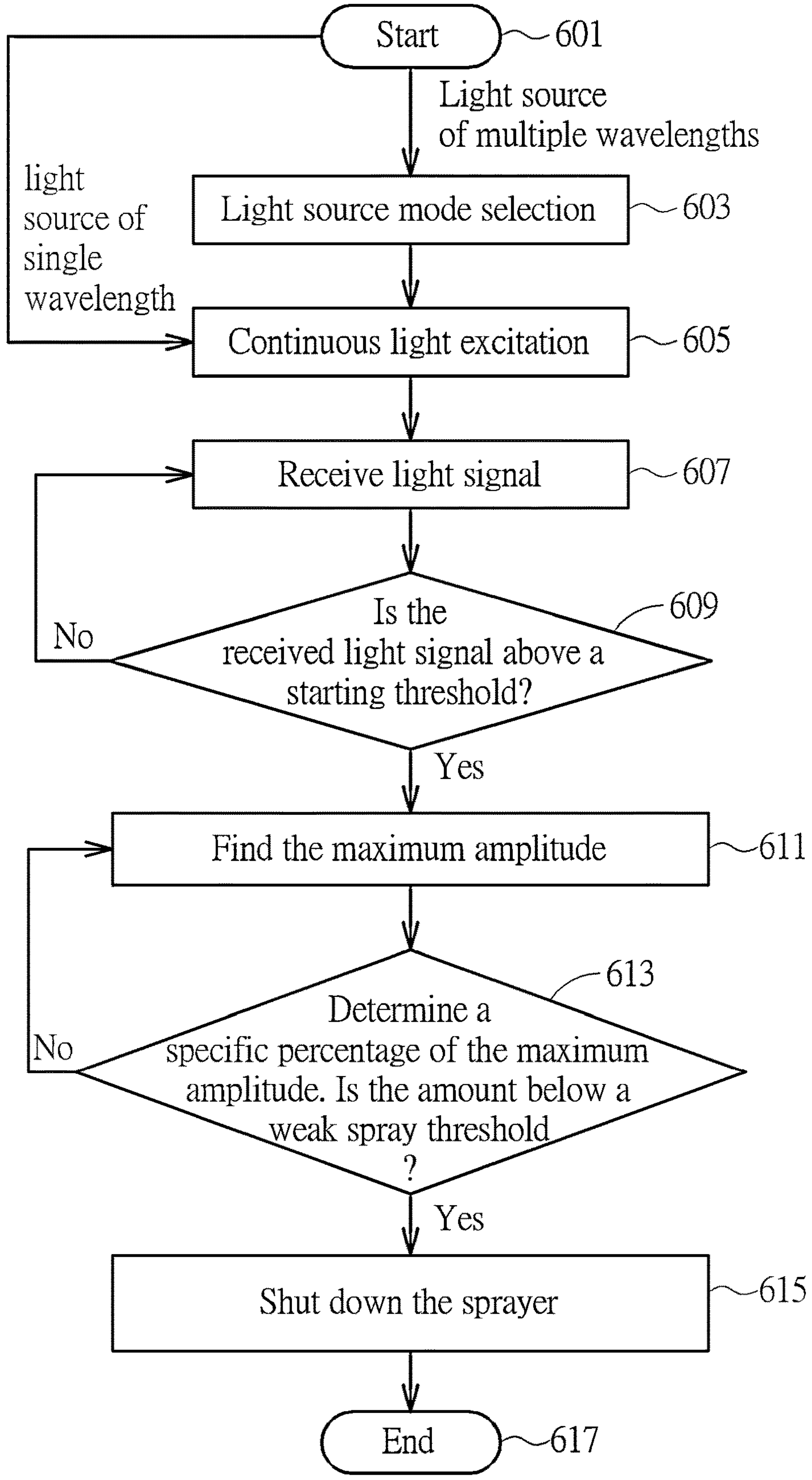
FIG. 6 is a flow chart illustrating operations of sprayers illustrated in FIG. 5, according to one embodiment of the present invention.

Refer to FIG. 6, which is a flowchart detailing an operation of the second optical sensor OS_2 and the processing circuit 113 for the sprayer 500. Note that the flow is not limited to the steps detailed below; other steps may be inserted, some steps may be deleted, and the order of the steps may be changed provided that the method detects a density of the emitted gas and uses that to control an operation of the sprayer.

The Flow in FIG. 6 Comprises Following Steps:

Step 601: Start. If light of multiple wavelengths is provided, go to Step 603; if light of a single wavelength is provided, go to Step 605.

Step 603: Light source mode selection.

Step 605: Continuous light excitation.

Step 607: Receive light signal.

Step 609: Is the received light signal above a starting threshold? If yes, go to Step 611; if no, return to Step 607.

Step 611: Find the maximum amplitude.

Step 613: Determine a specific percentage of the maximum amplitude. Is the amount below a weak spray threshold? If yes, go to Step 615; if no, go back to Step 611.

Step 615: Shut down the sprayer.

Step 617: End.

In the above-mentioned descriptions of FIG. 5 and FIG. 6, the processing circuit 113 turns off the resonator only according to the second optical data sensed by the second optical sensor OS_2. However, the processing circuit 113 may turn off the resonator according to the second optical data and the above-mentioned first optical data illustrated in the embodiments of FIG. 1 and FIG. 2.

In view of above-mentioned descriptions, if the brightness information of the second optical data is lower than a first threshold, it means the liquid level may be low. Also, if the foaming level is lower than a third level threshold, it may mean the liquid level may still be high. Accordingly, in one embodiment, the processing circuit does not turn off the resonator if brightness information of the second optical data is lower than a first threshold and the foaming level is lower than a third level threshold. Oppositely, in another embodiment, the processing circuit turns off the resonator if the brightness information of the second optical data is lower than a first threshold and the foaming level is higher than a forth level threshold. The third level threshold and the fourth level threshold may be identical, but may be different as well.

In the above-mentioned embodiments, all detection results are used as reference for turning off the resonator. However, the detection results can be used for estimating the liquid level in the container is high or low. For example, the processing circuit 113 may estimate the liquid level in the container 101 according to the foaming level and/or the conduction of the electrode, or according to the foaming level and/or the second optical data illustrated in FIG. 5 and FIG. 6. For a specific example, the processing circuit 113 estimates the liquid level is high if the foaming level is lower than a first level threshold and estimates the liquid level is low if the foaming level is higher than a second level threshold.

The liquid level is not limited to be used for turning off the resonator. For example, the spray can generate reminding information if the liquid level is low. For another example, in one embodiment, the container is connected to an outside solution resource, and the container is refilled if the liquid level is low. For still another example, the resonator may be turned off if the liquid level is low and be powered on again if the liquid level becomes from low to high.

In view of above-mentioned embodiments, the resonator may be turned on/turned off more properly and the liquid level may be more precisely estimated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sprayer, comprising:

a container, configured to contain a liquid;

a passage, comprising a first opening, a second opening, a resonator and a mesh, wherein when the liquid in the container is passed through the resonator via the first opening, the liquid is emitted as a gas via the second opening;

a first optical sensor, configured to sense first optical data of at least a portion of the mesh or at least a portion of a surface of the container; and a processing circuit, configured to compute a foaming level of the mesh or of the surface according to the first optical data, and configured to determine whether the resonator should be turned off or not according to the foaming level.

2. The sprayer of claim 1, wherein the first optical data is at least one sensing image, and the processing circuit computes the foaming level according to bright information of the sensing image.

3. The sprayer of claim 1, further comprising:

at least one electrode, disposed to the mesh;

wherein the processing circuit further determines whether the electrode is conductive or not;

wherein if the processing circuit determines that the electrode is conductive and the foaming level is lower than a first level threshold, the processing circuit does not turn off the resonator.

4. The sprayer of claim 1, further comprising:

at least one electrode, separately disposed to the mesh;

wherein the processing circuit further determines whether the electrode is conductive or not;

wherein if the processing circuit determines that the electrode is conductive and the foaming level is higher than a second level threshold, the processing circuit turns off the resonator.

5. The sprayer of claim 1, further comprising:

a detection device, disposed outside of the passage and comprising:

a light source, configured to emit light through a transparent window of the passage for illuminating the gas in the passage such that the gas reflects the emitted light to generate reflected light; and a second optical sensor, configured to detect second optical data generated according to the reflected light;

wherein the processing circuit does not turn off the resonator if brightness information of the second optical data is lower than a first threshold and the foaming level is lower than a third level threshold.

6. The sprayer of claim 1, further comprising:

a detection device, disposed outside of the passage and comprising:

a light source, configured to emit light through a transparent window of the passage for illuminating the gas in the passage such that the gas reflects the emitted light to generate reflected light; and a second optical sensor, configured to detect second optical data generated according to the reflected light;

wherein the processing circuit turns off the resonator if the brightness information of the second optical data is lower than a first threshold and the foaming level is higher than a forth level threshold.

7. The sprayer of claim 1, wherein the first opening is in a first surface of the container and the first optical sensor is disposed to a second surface of the container, wherein the second surface is opposite to the first surface.

8. The sprayer of claim 1, wherein the first opening is in a first surface of the container and the first optical sensor is disposed to a third surface of the container, wherein the third surface is non-parallel with the first surface.

9. The sprayer of claim 1, wherein the container comprises a first surface, a second surface and a third surface;

wherein the first opening is in the first surface, and the second surface is opposite to the first surface;

wherein the third surface is connected between the first surface and the second surface, and forms a corner with the second surface;

wherein the first optical sensor is disposed to the corner.

10. The sprayer of claim 1, wherein the first optical sensor is in the passage.

11. A sprayer, comprising:

a container, configured to contain a liquid;

a passage, comprising, a first opening, a second opening, a mesh and a resonator, wherein when the liquid in the container is passed through the resonator via the first opening, the liquid is emitted as a gas via the second opening;

a first optical sensor, configured to sense first optical data of at least a portion of the mesh in the first opening or at least a portion a surface of the container; and a processing circuit, configured to estimate a liquid level of the liquid according to the first optical data.

12. The sprayer of claim 10, wherein the first optical data is at least one sensing image, and the processing circuit estimates the liquid level according to bright information or a brightness level of the sensing image.

13. The sprayer of claim 11, further comprising:

at least one electrode, disposed to the mesh;

wherein the processing circuit further determines whether the electrode is conductive or not;

wherein if the processing circuit determines that the electrode is conductive and the foaming level is lower than a first level threshold, the processing circuit estimates the liquid level is high.

14. The sprayer of claim 11, further comprising:

at least one electrode, separately disposed to the mesh;

wherein the processing circuit further determines whether the electrode is conductive or not;

wherein if the processing circuit determines that the electrode is conductive and the foaming level is higher than a second level threshold, the processing circuit estimates the liquid level is low.

15. The sprayer of claim 11, further comprising:

a detection device, disposed outside of the passage and comprising:

a light source, configured to emit light through a transparent window of the passage for illuminating the gas in the passage such that the gas reflects the emitted light to generate reflected light; and a second optical sensor, configured to detect second optical data generated according to the reflected light;

wherein the processing circuit, the processing circuit estimates the liquid level is high if brightness information of the second optical data is lower than a first threshold and the foaming level is lower than a third level threshold.

16. The sprayer of claim 11, further comprising:

a detection device, disposed outside of the passage and comprising:

a light source, configured to emit light through a transparent window of the passage for illuminating the gas in the passage such that the gas reflects the emitted light to generate reflected light; and a second optical sensor, configured to detect second optical data generated according to the reflected light;

wherein the processing circuit, the processing circuit estimates the liquid level is low if the brightness information of the second optical data is lower than a first threshold and the foaming level is higher than a forth level threshold.

17. The sprayer of claim 11, wherein the first opening is in a first surface of the container and the first optical sensor is disposed to a second surface of the container, wherein the second surface is opposite to the first surface.

18. The sprayer of claim 11, wherein the first opening is in a first surface of the container and the first optical sensor is disposed to a third surface of the container, wherein the third surface is non-parallel with the first surface.

19. The sprayer of claim 11, wherein the container comprises a first surface, a second surface and a third surface;

wherein the first opening is in the first surface, and the second surface is opposite to the first surface;

wherein the third surface is connected between the first surface and the second surface, and forms a corner with the second surface;

wherein the first optical sensor is disposed to the corner.

20. The sprayer of claim 11, wherein the first optical sensor is in the passage.

* * * * *